United States Patent [19]
Gosen et al.

[11] Patent Number: 5,086,992
[45] Date of Patent: Feb. 11, 1992

[54] AEROPLANE OR MODEL AEROPLANE

[76] Inventors: Martinus C. Gosen, Lorentzstraat 18, 5707 EW Helmond; Andreas P. Bergmans, Kastanjelaan 1, Valkenswaard, both of Netherlands

[21] Appl. No.: 151,920
[22] Filed: Feb. 3, 1988
[30] Foreign Application Priority Data Feb. 12, 1987 [NL] Netherlands ............ 8700341

[51] Int. Cl.5 .................................. B64C 21/00
[52] U.S. Cl. ................................................ 244/36
[58] Field of Search .......... 244/36, 13, 25, 35 R, 244/118.1, 118.2

[56] References Cited

U.S. PATENT DOCUMENTS

| | | | |
|---|---|---|---|
| 2,734,701 | 2/1956 | Horton | 244/36 |
| 2,864,567 | 2/1958 | Kissinger | 244/36 |
| 2,989,269 | 6/1961 | Le Bel | 244/36 |
| 3,132,825 | 5/1964 | Postle et al. | 244/36 |
| 3,625,459 | 12/1971 | Brown | 244/36 |
| 4,149,688 | 4/1979 | Miller | 244/36 |
| 4,662,588 | 5/1987 | Henderson | 244/36 |

Primary Examiner—Jesús D. Sotelo
Assistant Examiner—Stephen P. Avila
Attorney, Agent, or Firm—Ladas & Parry

[57] ABSTRACT

Aeroplane whereby the fuselage is formed by a wing-shaped body having an at least substantially constant width along the length of the wing-shaped body. Wings extending in a substantially vertical direction from the longitudinal edges of the wing-shaped body, are provided on both sides of the wing-shaped body.

13 Claims, 6 Drawing Sheets

AEROPLANE OR MODEL AEROPLANE

The invention relates to an aeroplane whereby the fuselage is formed by a wing-shaped body having an at least subtantially constant width along the length of the wing-shaped body.

Such an aeroplane is e.g. known from the French patent No. 2,575,723. Here two usual horizontally extending wings are fixed to both sides of the wing-shaped body, which wings make the aeroplane very wide. From the Dutch patent No. 35,942 there is furthermore known an aeroplane which consists of a single wing and is only provided with a vertically extending rudder at the rear side, near its centre. The width of the wing-shaped body gradually decreases in rearward direction. Said aeroplane is furthermore provided with horizontal rudders at its rear side and with some ailerons near the front side, which will be incorporated in the plane of the wings during normal flight, however.

In practice such a plane did not prove to be satisfactory, however, as particularly when making curves there is a great danger that the aeroplane will stall and can no longer be controlled.

The purpose of the invention is to obtain an aeroplane of the above kind, whereby the disadvantages of the known construction described above can be avoided.

According to the invention this can be achieved because wings, extending in a substantially vertical direction from the longitudinal edges of the wing-shaped body, are provided on both sides of the body.

When such wings are used an undesired stalling of the aeroplane is effectively prevented, so that such an aeroplane will have good navigating properties while maintaining the simple and efficient construction of a wing-shaped body.

Furthermore the width of the aeroplane is substantially equal to the width of the fuselage because there are no long horizontally extending wings present.

It is noted that from U.S. Pat. No. 3,680,814 there is known an aeroplane which is provided with a fuselage whose section has a more or less U-shaped curved extension, in which fuselage the passenger and the cargo compartments are incorporated, whilst between the vertically extending fuselage parts there are fixed platforms for supporting the engines.

This construction is constructionally complicated whilst there will be comparatively little space for passengers and/or cargo.

The invention will be explained hereinafter with reference to a few embodiments of the construction according to the invention diagrammatically illustrated in the accompanying figures.

Figure 2:
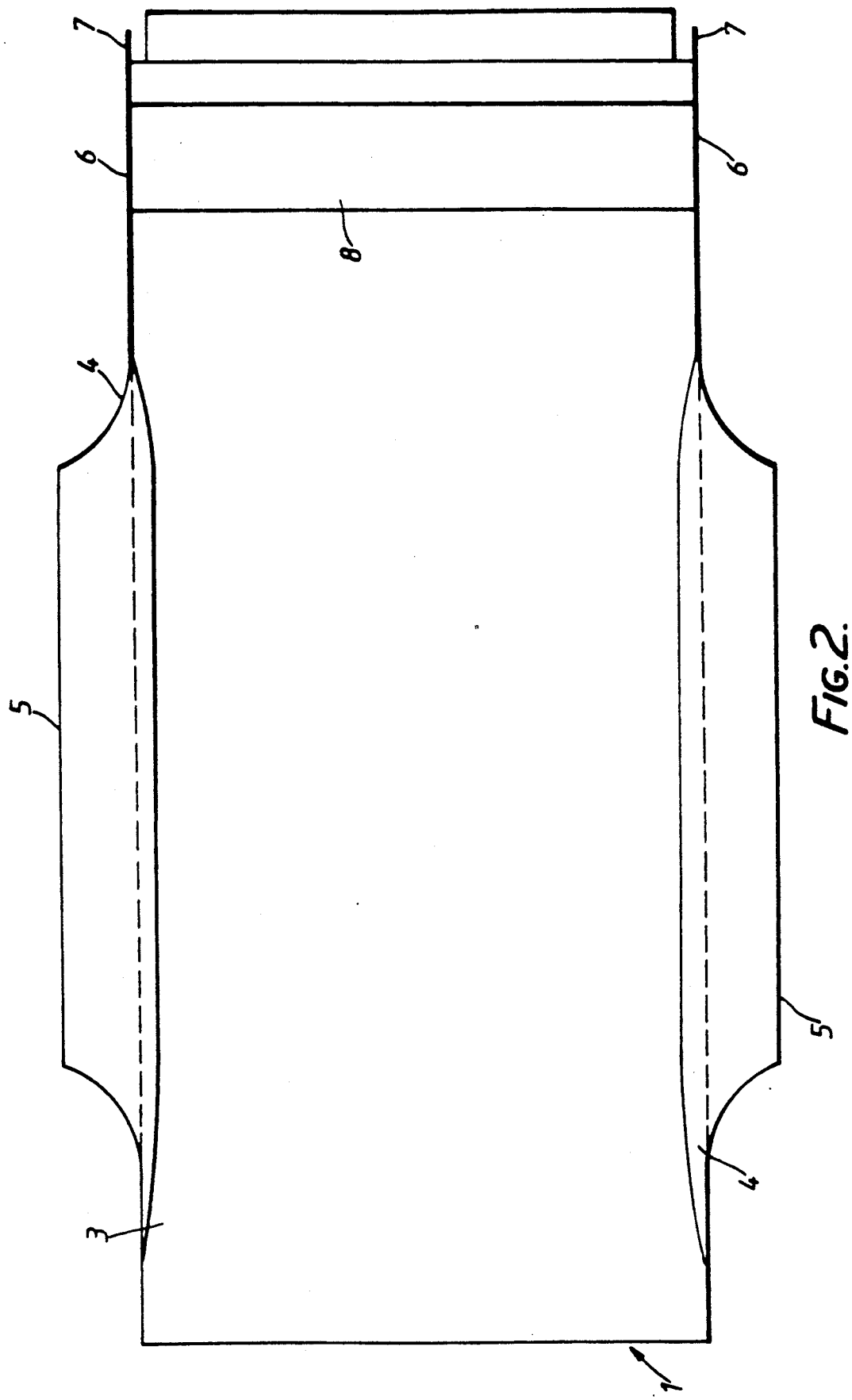
FIG. 2 is a top view of the aeroplane illustrated in FIG. 1.

As is illustrated in the figures the aeroplane comprises a fuselage 1 formed by a wing-shaped body, the lower boundary plane 2 of said fuselage being curved only very little, whilst the upper boundary plane 3 is curved more strongly, all this such that seen in vertical section the fuselage has a shape comparable with the shape of a usual aeroplane wing, seen in section. Seen in top view the wing-shaped body thereby has an at least substantially rectangular shape (FIG. 2), so that the wing-shaped body can have an optimum capacity.

Figure 3:
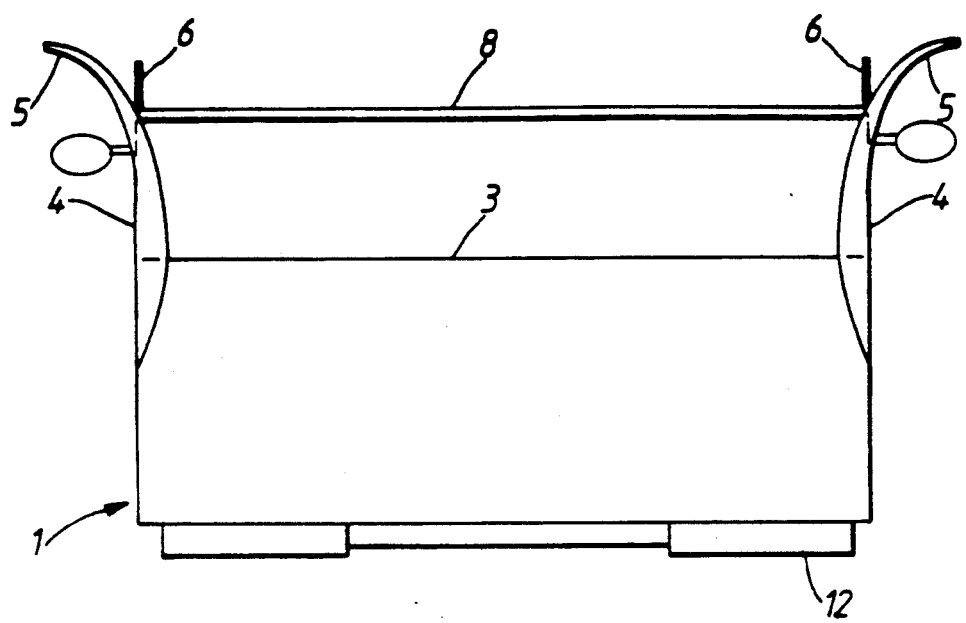
FIG. 3 is a front view of the aeroplane, according to the arrow III in FIG. 1.

Fixed to the sides of the wing-shaped body 1 are upwardly extending wings 4, whose boundary planes facing away from each other extend vertically along part of the height of the wings, whilst the upper ends 5 of the wings are curved outwards in a direction facing away from each other, as appears in particular from FIG. 3. The rear parts 6 of the wings extend vertically along their entire height and to these rear parts there are connected rudders 7 which pivot about vertical axes.

In the illustrated embodiment there is furthermore provided a wing-shaped connecting profile 8 between the rear parts 6 of the wings, which connecting profile may also be arranged adjustably about a horizontal axis.

As is further illustrated an aileron 10, which pivots about a horizontal pivot pin 9, may furthermore be provided at the rear boundary wall of the wing-shaped fuselage 1, which aileron may be constructed from several parts which can be adjusted independently of each other. In a similar manner a few ailerons 12, adjustable independently of each other about horizontal pivot pins 11 extending perpendicularly to the longitudinal direction of the aeroplane, are provided more to the front at the bottom side of the fuselage.

Wheels (not shown) may be connected to the fuselage in a manner known by itself, such that said wheels can be retracted into the fuselage during the flight and can be moved out again before landing.

The wings 4 reaching above the wing-shaped body 1 forming the actual fuselage of the aeroplane may be used for mounting the engines, which may be provided to the wings 4 behind and/or above each other.

At the same time the hollowly constructed wings can also be used in the usual manner as a storage space for the fuel.

The wings reaching above the fuselage will not only provide the aeroplane with a great stability when making curves, but during flight these wings also prevent air from flowing from the sides of the fuselage to the space above the fuselage where there is an underpressure.

Because furthermore the fuselage has an at least substantially rectangular shape, seen in top view, not only a simple and thus cheaply produced construction of the aeroplane is obtained, but also a room in the wing-shaped body 1 which can be used optimally.

For the rest the upwardly extending wings do not form impeding projections, like the wings of the aeroplanes commonly used so far, which does not only simplify manoeuvering the aeroplanes on airfields and reduces the parking space required for such aeroplanes, but also contributes substantially to the safety, because e.g. with (emergency) landings the risk that a wing, projecting far, will touch the ground with its outer end is excluded. Also when making (emergency) landings on water surfaces such a plane will have considerable advantages, as it will have a great buoyancy.

Figure 1:
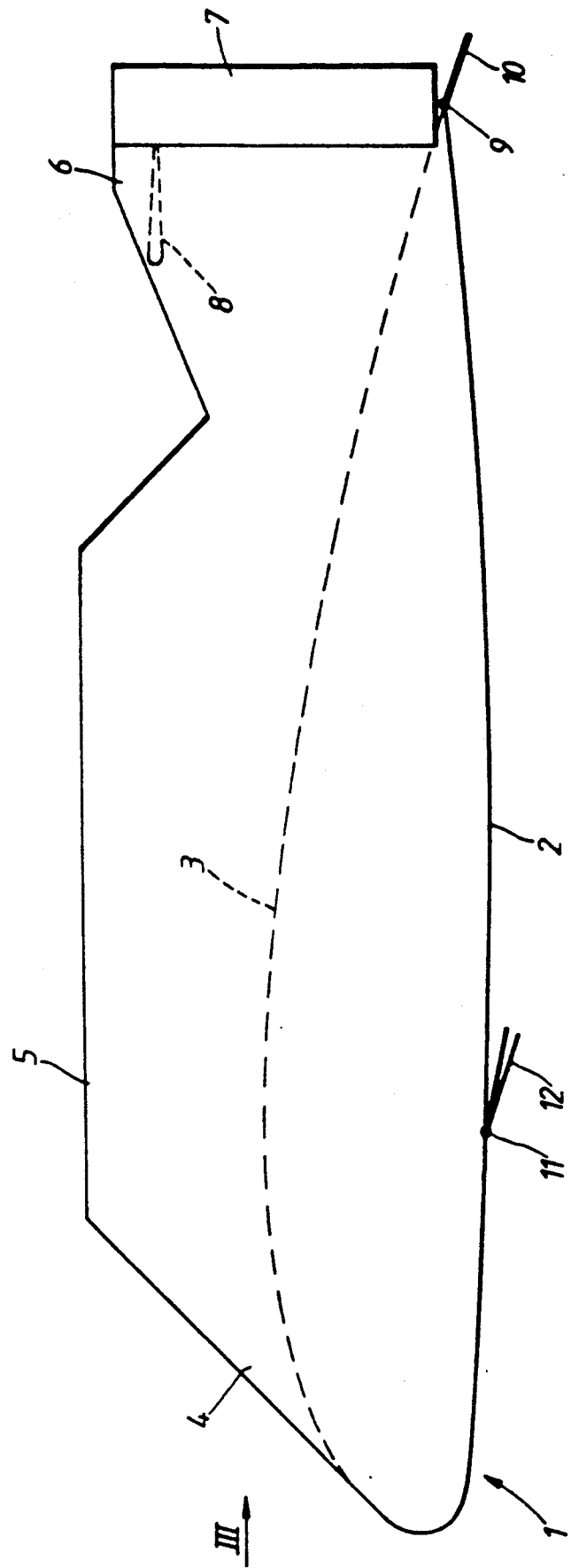
FIG. 1 is a diagrammatic side view of an embodiment of an aeroplane according to the invention.

Of course variations and/or additions to the construction described above and illustrated in the FIGS. 1-3 will be conceivable withing the spirit and scope of the invention.

Figure 4:
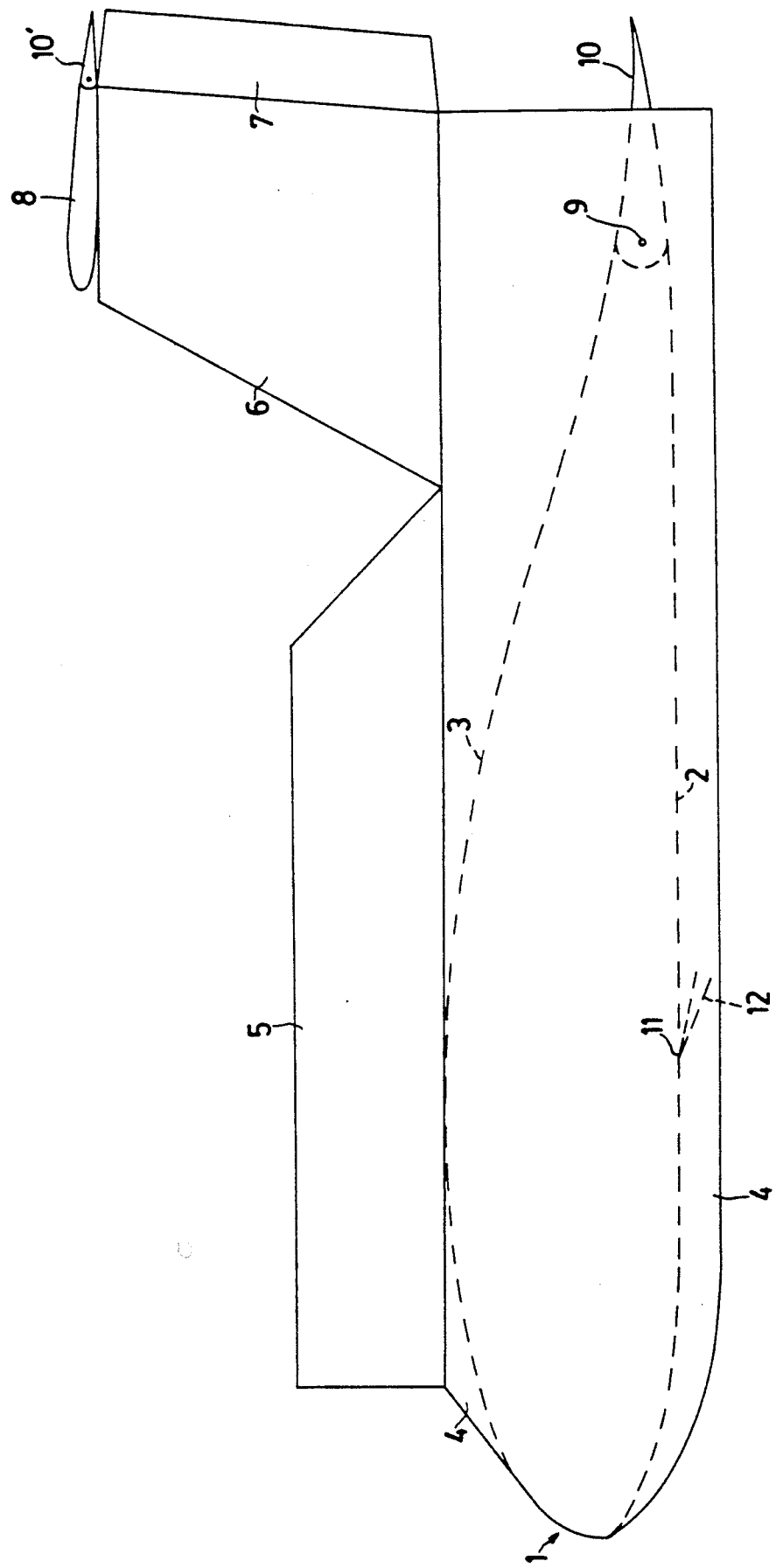
FIG. 4 is a diagrammatic side view of a second embodiment of an aeroplane according to the invention.
Figure 5:
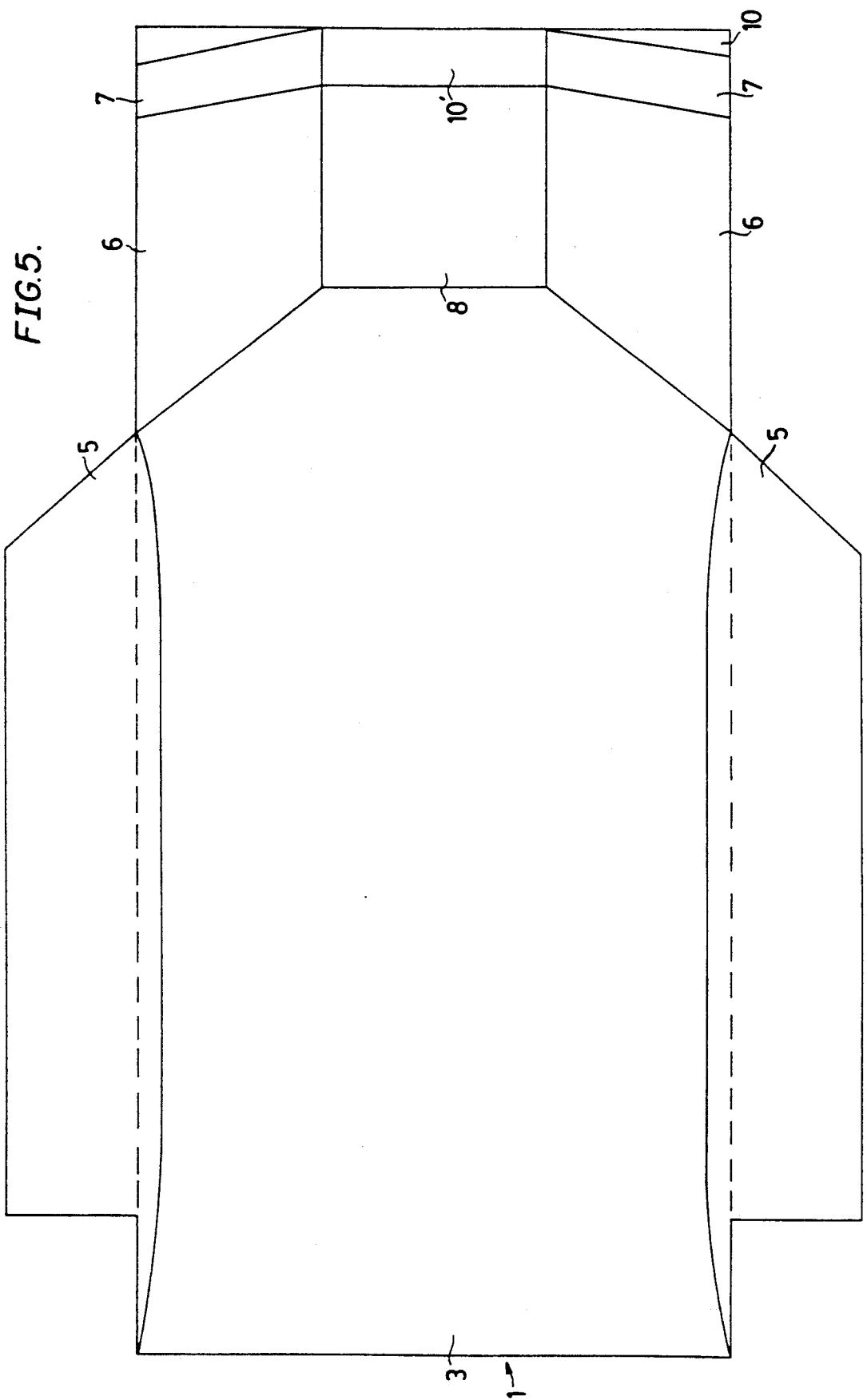
FIG. 5 is a top view of FIG. 4.
Figure 6:
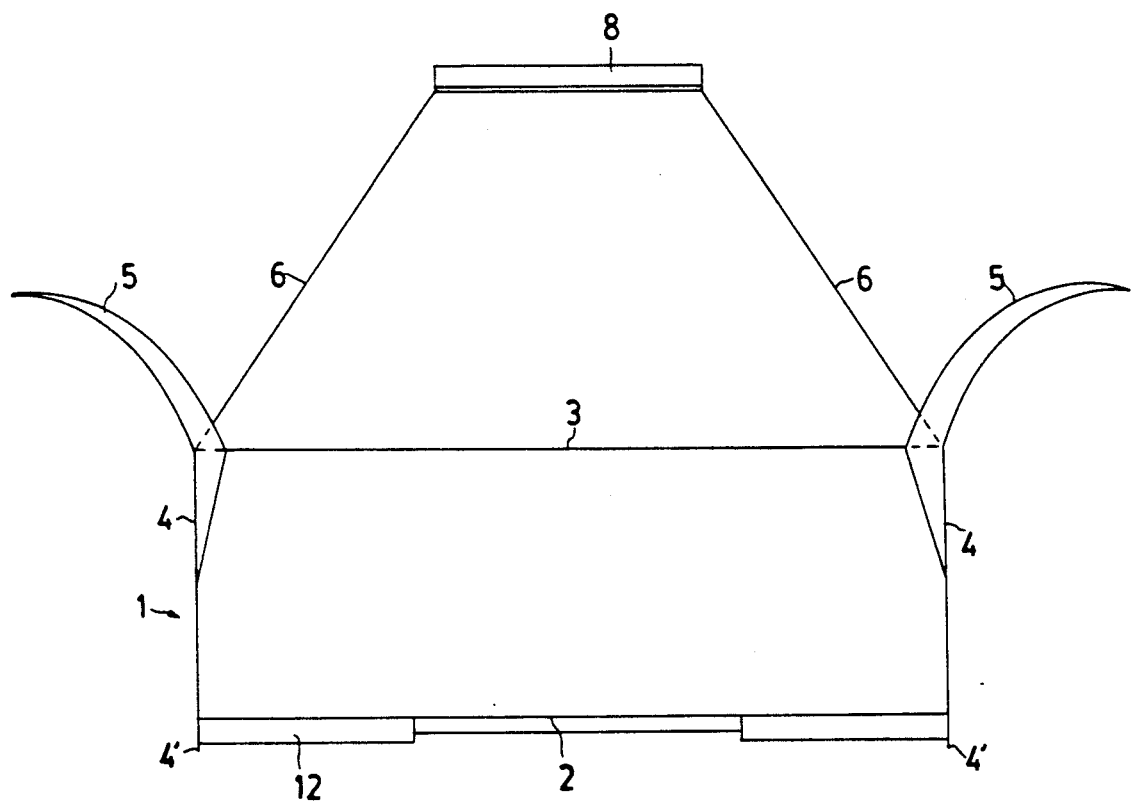
FIG. 6 is a front view of FIG. 4.

Thus FIGS. 4-6 diagrammatically illustrate a further embodiment of an aeroplane according to the invention. Those parts that correspond with the parts of the aeroplane described above with reference to the FIGS. 1-3 are provided with the same reference numbers as used in connection with the FIGS. 1-3.

As appears in particular from FIGS. 4 and 6 the wings are provided with extensions 4' projecting under the fuselage 1 in this embodiment. During flight said extensions 4' of the wings 4 projecting under the fuselage prevent air from flowing away sideways under the bottom plane of the fuselage 2, which has an advantageous influence on the lift of the aeroplane.

When using the aeroplane as a seaplane the extensions 4' of the wings projecting under the fuselage will act as a kind of leeboards, which will oppose a sideways drifting off of the aeroplane floating on the water. Also when taking off from the water said extensions 4' of the wing projecting under the fuselage will have an advantageous effect on getting off from the water, because the air flowing under the fuselage will be prevented from moving out sideways during starting.

As furthermore appears, in particular from FIGS. 5 and 6, the wing parts 6, to which the rudders are connected, may be efficiently provided, such that they slope upwards from their bottom ends in a direction toward each other, so that also the axes of rotation, by means of which the rudders 7 are connected to the rear ends of said wing parts 6, slope similarly upwards in a direction toward each other.

Because of said oblique arrangement it will be possible to influence the rolling moment generated when making a curve, caused by the resultant of the forces exerted on a rudder, and the distance of said resultant to the centre of gravity of the aeroplane, in particular by varying the magnitude of said distance dependent on the angle at which a relevant wing part 6 with rudder 7 slopes upwards.

A further influencing of said value may furthermore be obtained by gradually decreasing the width of the rudder 7 in vertical direction, instead of constructing the rudder with an at least substantially constant width, as is indicated in FIG. 7. As a result the resultant of the force exerted on the rudder when making a curve will be lower than with a rudder having a constant width along its entire height.

Another possibility is to place the rudders 7 a little more to the front, so that they will be located above the end of the fuselage.

As is furthermore indicated in FIGS. 4 and 5 an aileron 10' may furthermore be pivotally coupled to the rear edge of the connecting profile 8 preferably constructed to have a wing-shaped section.

Furthermore the wings and/or the curved upper ends 5 of the wings may extend further forwards relatively to the fuselage than is illustrated in the figures.

It is intended that also model aeroplanes will lie within the scope of the claims.

We claim:

1. An airplane comprised of:
    a fuselage for carrying passengers, said fuselage being wing-shaped in longitudinal cross-section and thereby having a front end, a tail end located opposite said front end, sides connecting said front end and said tail end, a generally flat base and a rounded top;
    a first wing mounted on one of said sides near said front end and a second wing mounted oppositely of said first wing on the other of said sides, said wings extending vertically above said rounded top to define upper-most ends, said upper-most ends curving away from said passenger body; and powering means associated with said wings.

2. The airplane of claim 1 wherein said powering means are located on said wings.

3. The airplane of claim 1 wherein said wings extend along the entire length of said sides and wherein said curved portion of said wings extends from near said front end to beyond the center of said fuselage.

4. The airplane of claim 1 wherein the longitudinal cross-section of said fuselage is generally constant in shape throughout the entire width of the fuselage.

5. The airplane of claim 1 wherein said wings have rear ends near the tail end of said fuselage and wherein said airplane is further comprised of rudders located adjacent the rear ends of said wings and extending beyond the top of said fuselage to define upward axes of rotation said rudders being pivotable about said upward axes of rotation.

6. The airplane of claim 1 wherein said wings have rear ends near the tail end of said fuselage and wherein said airplane further comprises rudders associated with the rear ends of said wings, said rudders extending beyond and inwardly of said top of said fuselage to define axes of rotation such that the axes of rotation of said rudders slope toward each other.

7. The airplane of claim 5 wherein said rudders are comprised of a base and a top said base being wider than said top such that the width of said rudder decreases, said base being located closest to said fuselage.

8. The airplane of claim 1 wherein said wings extend vertically below said base of said fuselage.

9. The airplane of claim 1 further comprising an aileron connected near the tail end of said fuselage and pivotable about a horizontal axis.

10. The airplane of claim 1 further comprising a horizontally extending connecting profile, said profile being connected between said wings near the tail end of said fuselage and above said top of said fuselage; and
    an aileron attached to the near edge of said connecting profile and pivotable about a horizontal axis.

11. The airplane of claim 6 further comprising a generally horizontally extending connecting profile, said profile being connected between said wings near the tail end of said fuselage and above said top of said fuselage; and
    an aileron attached to the rear edge of said connecting profile and pivotable about a horizontal axis.

12. The airplane of claim 10 wherein said connecting profile is wing-shaped in lateral cross section its widest portion being closest to the front end of said fuselage.

13. Aeroplane according to claim 1 characterized in that the cross-section of the wing-shaped body remains constant along its entire width.

* * * * *